(12) United States Patent
Oberfell et al.

(10) Patent No.: US 12,504,314 B2
(45) Date of Patent: Dec. 23, 2025

(54) WEIGHING DEVICE, METHOD FOR DETERMINING A CENTER OF GRAVITY OF A MOTOR VEHICLE, AND METHOD FOR OPERATING A MOTOR VEHICLE

(71) Applicant: Daimler Truck AG, Leinfelden-Echterdingen (DE)

(72) Inventors: Ralf Oberfell, Asperg (DE); Wilhelmus Kok, Weinstadt (DE); Christian Bootz, Boeblingen (DE)

(73) Assignee: Daimler Truck AG, Leinfelden-Echterdingen (DE)

( * ) Notice: Subject to any disclaimer, the term of this patent is extended or adjusted under 35 U.S.C. 154(b) by 253 days.

(21) Appl. No.: 18/042,951

(22) PCT Filed: Jun. 25, 2021

(86) PCT No.: PCT/EP2021/067471
§ 371 (c)(1),
(2) Date: Feb. 24, 2023

(87) PCT Pub. No.: WO2022/042900
PCT Pub. Date: Mar. 3, 2022

(65) Prior Publication Data
US 2023/0236059 A1     Jul. 27, 2023

(30) Foreign Application Priority Data
Aug. 25, 2020   (DE) .................. 10 2020 005 183.9

(51) Int. Cl.
*G01G 19/02*          (2006.01)
(52) U.S. Cl.
CPC ................. *G01G 19/025* (2013.01)

(58) Field of Classification Search
CPC ............................. G01G 19/02; G01G 19/025
See application file for complete search history.

(56) References Cited

U.S. PATENT DOCUMENTS

| | | | | |
|---|---|---|---|---|
| 5,189,920 A | * | 3/1993 | Martinez ................ | G01N 19/02 73/9 |
| 6,327,526 B1 | * | 12/2001 | Hagan ................... | G01M 17/00 701/34.3 |

(Continued)

FOREIGN PATENT DOCUMENTS

| CN | 101893517 A | 11/2010 |
|---|---|---|
| CN | 102257354 A | 11/2011 |

(Continued)

OTHER PUBLICATIONS

PCT/EP2021/067471, International Search Report dated Oct. 15, 2021 (Two (2) pages).

(Continued)

*Primary Examiner* — Natalie Huls
(74) *Attorney, Agent, or Firm* — Crowell & Moring LLP (57) ABSTRACT

A weighing device for determining a center of gravity of a motor vehicle includes at least two weighing elements where a respective measured value characterizing a weight of the motor vehicle is determinable by each of the at least two weighing elements. The respective measured values are receivable from the at least two weighing elements by a computing device and the center of gravity of the motor vehicle is determinable depending on the respective measured values by the computing device. An alignment of the at least two weighing elements relative to one another is adjustable by a displacement device.

9 Claims, 3 Drawing Sheets

(56) References Cited

U.S. PATENT DOCUMENTS

| | | | |
|---|---|---|---|
| 7,054,727 B2* | 5/2006 | Kemp | G01M 17/007 |
| | | | 701/32.9 |
| 8,229,701 B1 | 7/2012 | Holz et al. | |
| 9,121,786 B2* | 9/2015 | Tie | G01M 1/122 |
| 2010/0198492 A1* | 8/2010 | Watanabe | G01G 23/3728 |
| | | | 701/124 |
| 2011/0308309 A1 | 12/2011 | Nobis et al. | |
| 2013/0081451 A1 | 4/2013 | Kamada et al. | |
| 2020/0388164 A1 | 12/2020 | Domprobst et al. | |
| 2021/0162965 A1* | 6/2021 | Mellings | B60T 8/1755 |

FOREIGN PATENT DOCUMENTS

| | | | | |
|---|---|---|---|---|
| CN | 102680064 A | | 9/2012 | |
| CN | 102853886 A | | 1/2013 | |
| CN | 107894338 A | * | 4/2018 | G01G 19/02 |
| CN | 108204849 A | * | 6/2018 | G01G 19/02 |
| CN | 111512351 A | | 8/2020 | |
| CN | 111521248 A | | 8/2020 | |
| DE | 34 40 571 A1 | | 11/1985 | |
| DE | 10 2011 079 668 B3 | | 8/2012 | |
| DE | 10 2013 016 488 A1 | | 4/2015 | |
| EP | 2 862 773 A2 | | 4/2015 | |
| EP | 3 407 030 A1 | | 11/2018 | |
| FR | 2.080.009 A5 | | 11/1971 | |
| JP | 8-170935 A | | 7/1996 | |
| JP | 2007-78445 A | | 3/2007 | |
| JP | 4523900 B2 | | 3/2007 | |
| JP | 2012-32328 A | | 2/2012 | |
| JP | 2014-157109 A | | 8/2014 | |
| JP | 5729863 B2 | | 6/2015 | |

OTHER PUBLICATIONS

German-language German Office Action issued in German application No. 10 2020 005 183.9 dated Mar. 4, 2022 (Four (4) pages).
Chinese language Office Action issued in Chinese Application No. 202180050756.5 dated Jan. 25, 2025 with partial English translation (18 pages).
Chinese-language Office Action issued in Chinese Application No. 202180050756.5 dated Sep. 6, 2025 with English translation (16 pages).

* cited by examiner

WEIGHING DEVICE, METHOD FOR DETERMINING A CENTER OF GRAVITY OF A MOTOR VEHICLE, AND METHOD FOR OPERATING A MOTOR VEHICLE

BACKGROUND AND SUMMARY OF THE INVENTION

The invention relates to a weighing device for determining a center of gravity of a motor vehicle, a method for determining a center of gravity of a motor vehicle, and a method for operating a motor vehicle.

A control system for a motor vehicle having actuators for a vehicle drive, steering and chassis is known from DE 10 2011 079 668 B3. The control system comprises a requirement level having several recording units that are respectively equipped to record specifications of a vehicle user. The control system further comprises processing units that are equipped to determine a provisional intended movement vector for the motor vehicle or to determine an intended movement vector for the motor vehicle from the provisional intended movement vector and a determined operating variable. The control system further comprises a control level to which at least one control unit is assigned, by means of which a force vector is to be determined depending on the intended movement vector and at least one specified parameter set for a specified system control function. The control system additionally has an actuation level to which a processing unit is assigned that is equipped to determine respective manipulated variables for actuators depending on the determined force vectors.

A motor vehicle comprising at least one driver assistance system for calculating prediction data in advance via at least one future driving situation of the motor vehicle by evaluating ego data relating to the motor vehicle and environment data relating to the motor vehicle environment is further known from DE 10 2013 016 488 A1. The motor vehicle can be controlled by a driver in a first operating mode of the driver assistance system and the control of the motor vehicle is achieved autonomously via the driver assistance system without the possibility of intervention by the driver in a second operating mode of the driver assistance system. The driver assistance system is equipped to temporarily switch from the first operating mode to the second operating mode when a triggering condition is met. The driver assistance system is designed to determine a limit value for a vehicle parameter from trajectory data and driver property data. The triggering condition or one of the triggering conditions is an exceeding or falling short of the limit value.

The object of the present invention is to create a weighing device for determining a center of gravity of a motor vehicle, a method for determining a center of gravity of a motor vehicle, and a method for operating a motor vehicle that enable the motor vehicle to be controlled with a particularly high vehicle stability.

The invention relates firstly to a weighing device for determining a center of gravity of a motor vehicle, having at least four weighing elements, particularly two weighing elements for each axle of the motor vehicle to be measured. One weighing element is particularly provided for each end of each axle of the motor vehicle. A measured value characterising a weight of the motor vehicle can respectively be determined by means of the weighing elements. The weighing device further comprises a computing device, particularly an electronic computing device, by means of which the respective measured values can be received from the weighing elements and by means of which the center of gravity can be determined depending on the measured values received. The weighing device additionally comprises a displacement device, by means of which the alignment of the weighing elements relative to one another can be adjusted. This means that the weighing elements can be moved relative to one another by means of the displacement device, whereby the motor vehicle supported on the weighing elements can be tipped. By tipping the motor vehicle, the weight of the motor vehicle can be distributed differently over the respective weighing elements on which the motor vehicle is supported. If the weighing elements move relative to one another, a weight of the motor vehicle supported on the weighing elements is displaced, wherein the center of gravity of the motor vehicle can be determined by means of the electronic computing device from a relative displacement of the weight of the motor vehicle supported on the weighing elements combined with the respective relative alignment of the weighing elements in relation to one another. The weighing device thus enables the center of gravity of the motor vehicle to be determined particularly easily, precisely and reliably.

In a development of the invention, it has proved advantageous if at least one wheel of the motor vehicle can be supported on each of the weighing elements. The motor vehicle can be supported against the weighing element via the respective wheel. The respective at least one wheel stands in particular directly on the respectively assigned weighing element, whereby the weight of the motor vehicle is recorded via the wheel by means of the weighing element. The weighing elements can be moved individually relative to one another via the displacement device, whereby the motor vehicle supported on the weighing elements can be displaced, and particularly tipped with particularly little difficulty by adjusting the respective alignment of the weighing elements.

In an alternative advantageous embodiment of the invention, a support element is provided, the underside of which is supported on the weighing elements, on the upper side of which the motor vehicle can be parked, and which can be aligned three-dimensionally by means of the displacement device. The support element can particularly be integrated in a road and is flush with the road in an alignment of the weighing elements relative to one another. The motor vehicle can be arranged on the upper side of the support element, wherein the weighing elements supporting the underside of the support element are arranged assigned to the respective free ends of the axles of the motor vehicle. The alignment of the support element in the space can be adjusted by means of the displacement device, wherein the underside of the support element is supported on the weighing elements in every alignment, said weighing elements bearing the weight of the support element or the weight of the motor vehicle supported on the support element. The support element enables the motor vehicle to be particularly easily arranged on the weighing device, with the respective ends of the axles of the motor vehicle assigned to the respective weighing elements.

The invention further relates to a method for determining a center of gravity of a motor vehicle, wherein the motor vehicle is parked on the weighing device with each axle end of respective axles of the motor vehicle assigned to a respective weighing element of the weighing device. The weighing device is particularly a weighing device as has already been described in connection with the weighing device according to the invention. It is further provided in the method that an alignment of the weighing elements relative to one another is adjusted by means of a displacement device, wherein the weighing elements are arranged in at least two different alignments relative to one another, and a respective measured value characterising a weight of the motor vehicle is recorded in each of the alignments. This means that, in the method, the weighing elements are arranged in a first alignment relative to one another by means of the displacement device and a first measured value characterising the weight of the motor vehicle is recorded, and then the weighing elements are displaced from the first alignment into a second alignment by means of the displacement device, a second measured value characterising the weight of the motor vehicle being recorded in said second alignment by means of the respective weighing elements. The weighing elements can be arranged in further alignments by means of the displacement device, further measured values being determined in said further alignments by means of the respective weighing elements. It is further provided in the method that the measured values are received by means of a computing device, particularly from the weighing elements, and the center of gravity of the motor vehicle is determined on the basis of the measured values. The center of gravity of the motor vehicle can be calculated from the measured values by means of mathematical methods. It is thus provided in the method that the center of gravity of the motor vehicle is determined on the basis of a weight displacement of the motor vehicle supported on the weighing elements resulting from a displacement of the weighing elements relative to one another. The method enables a center of gravity of the motor vehicle for a respective current load state of the motor vehicle to be determined particularly easily and precisely.

In a development of the invention, it is provided that the weighing elements are arranged in three alignments differing from one another by means of the displacement device. Each of the alignments is assigned to a respective state of the weighing device. In a first state in which the weighing elements are arranged in a first, horizontal plane, a respective first measured value characterising a weight of the motor vehicle is recorded by means of the weighing elements. In a second state in which the weighing elements are arranged in a second plane pivoted around a transverse direction of the motor vehicle relative to the first plane, a respective second measured value characterising a weight of the motor vehicle is recorded by means of the weighing elements. In a third state in which the weighing elements are arranged in third plane pivoted around a longitudinal direction of the motor vehicle relative to the first plane, a respective third measured value characterising a weight of the motor vehicle is recorded by means of the weighing elements. The weighing device is particularly displaced into the first state, from the first state into the second state and from the second state into the third state, one directly after the other. The weighing elements thus pass through the first alignment assigned to the first state, the second alignment assigned to the second state and the third alignment assigned to the third state, one at a point in time directly after the other. In the method, the motor vehicle arranged on the weighing device is thus first aligned at least substantially horizontally, then pivoted around the transverse direction of the vehicle, and then pivoted around the longitudinal direction of the vehicle. A weight displacement of the motor vehicle thus occurs between the respective weighing elements. The current center of gravity of the motor vehicle is determined via this weight displacement of the motor vehicle determined on the basis of the recorded measured values when the weighing elements are displaced. The center of gravity of the motor vehicle can be determined particularly easily, precisely and quickly by the weighing device passing through the three states.

It has proved advantageous in further embodiments of the invention if the method steps of the method for determining the center of gravity of the motor vehicle are respectively carried out for a semitrailer engine and for a semitrailer comprising the semitrailer engine and a trailer. The center of gravity of the trailer can then be determined from the center of gravity of the semitrailer engine and the determined center of gravity of the semitrailer by means of the computing device. This means that the semitrailer engine is arranged on the weighing device and the center of gravity of the semitrailer engine is determined by carrying out the method. The entire semitrailer comprising the trailer is further arranged on the weighing device and the center of gravity of the semitrailer comprising the trailer is determined by means of the method. The center of gravity of the trailer is determined by means of the electronic computing device via a difference calculation between the determined centers of gravity of the semitrailer engine and of the semitrailer. The respective determined centers of gravity of the semitrailer engine and/or of the semitrailer and/or of the trailer can be stored in the respective driver assistance systems of the semitrailer, particularly of the semitrailer engine or the trailer, and be used to control the semitrailer, particularly the semitrailer engine or the trailer.

The invention further relates to a method for operating a motor vehicle, wherein a center of gravity of the motor vehicle is received by means of a driver assistance system, wherein the center of gravity is determined in a method as has already been described in connection with the method according to the invention for determining a center of gravity of a motor vehicle. It is further provided in the method that the motor vehicle is controlled depending on the center of gravity received. It is particularly provided that a maximum front wheel steering angle and/or a steering angle speed and/or a steering angle acceleration are adjusted depending on the received center of gravity. It is particularly provided that a maximum steering angle and/or a maximum steering moment are delimited depending on the determined center of gravity. It is particularly provided in the method that the motor vehicle is at least partially automated, particularly fully automated, and thus autonomously controlled, and particularly controlled transversely and/or longitudinally at least partially autonomously. The method described enables a maximum physical limit region of the motor vehicle to be determined particularly precisely due to the particularly precise center of gravity provided, and the motor vehicle can be particularly advantageously controlled using this maximum physical limit region.

In this context it has proved particularly advantageous if a steering angle and/or a steering speed and/or a steering moment are selected for controlling the motor vehicle of which a resulting total force on a respective wheel of the motor vehicle does not exceed a pre-determined traction limit. To determine the traction limit, Kamm's circle of friction can particularly be selected to provide the basis for the determination. This means that this traction limit is determined on the basis of Kamm's circle of friction. It is thus provided in the method that the steering angle and/or the steering speed and/or the steering moment are selected such that the traction limit substantially avoids being exceeded at each of the wheels of the motor vehicle. A particularly high vehicle stability can thus be guaranteed when controlling the vehicle.

In a further embodiment of the invention, it has proved advantageous if, depending on the received center of gravity, a tipping limit of the motor vehicle is determined and a steering angle and/or a steering speed and/or a steering moment are selected for the motor vehicle depending on the tipping limit. A steering angle and/or a steering speed and/or a steering moment are particularly selected for which the resulting tipping angle does not exceed the tipping limit. It is thus determined where the tipping limit for the motor vehicle lies depending on the received center of gravity of the motor vehicle. The steering angle and/or the steering speed and/or the steering moment are further selected such that the motor vehicle does not tip over the tipping limit, whereby it can be at least substantially avoided that the motor vehicle tips over.

In a further embodiment of the invention it has proved advantageous if a steering angle and/or a steering speed and/or a steering moment are selected for the motor vehicle depending on a manageability limit of a safety driver. This means that the manageability limit of the safety driver is determined and then the steering angle and/or a steering speed and/or a steering moment are selected such that the manageability limit of the safety driver is not exceeded. A trajectory resulting from the steering angle and/or the steering speed and/or the selected steering moment is particularly determined, wherein the steering angle and/or the steering speed and/or the steering moment are selected such that the manageability limit of the safety driver is not exceeded for the resulting trajectory. It can thus be ensured that the safety driver can intervene in the control of the motor vehicle at any time, whereby dangerous situations can be managed and a danger of accident can be kept particularly low.

Further advantages, features and details of the invention result from the following description of preferred exemplary embodiments and with reference to the drawings. The features and combinations of features previously specified in the description and the features and combinations of features specified in the following description of figures and/or shown only in the figures can be used not only in the respectively disclosed combination, but also in other combinations or in isolation without leaving the scope of the invention.

BRIEF DESCRIPTION OF THE DRAWINGS

FIGS. 2a-2b show respective schematic side views of the weighing device in the second embodiment, wherein the motor vehicle is deposited on the weighing device, wherein a respective axle end of each axle of the motor vehicle is assigned to a weighing element of the weighing device and the weighing elements are equipped to record a respective measured value characterising the weight of the motor vehicle, wherein the weighing elements in FIG. 2a are arranged in a first alignment relative to one another and are arranged in a second alignment relative to one another in FIG. 2b and the weighing elements in the first alignment record a respective first measured value and record a respective second measured value in the second alignment and a center of gravity of the motor vehicle is determined by means of an electronic computing device depending on the first measured values and the second measured values;

FIG. 3 shows a schematic side view of the weighing device in the first embodiment, wherein the weighing device comprises a support element that is supported on the weighing elements and on which the motor vehicle can be supported, wherein the motor vehicle can be supported on the support element such that each axle end of each axle of the motor vehicle is assigned to at least one weighing element, wherein respective measured values characterising a respective weight of the motor vehicle can be recorded by means of the weighing elements and the support element can be arranged in different alignments via the weighing elements supporting the support element by means of the displacement device, wherein the respective measured values can be recorded in the respective alignments of the support element by means of the weighing elements and the center of gravity of the motor vehicle can be determined by means of the electronic computing unit with reference to the measured values of the different alignments of the support element.

DETAILED DESCRIPTION OF THE DRAWINGS

Figure 1:
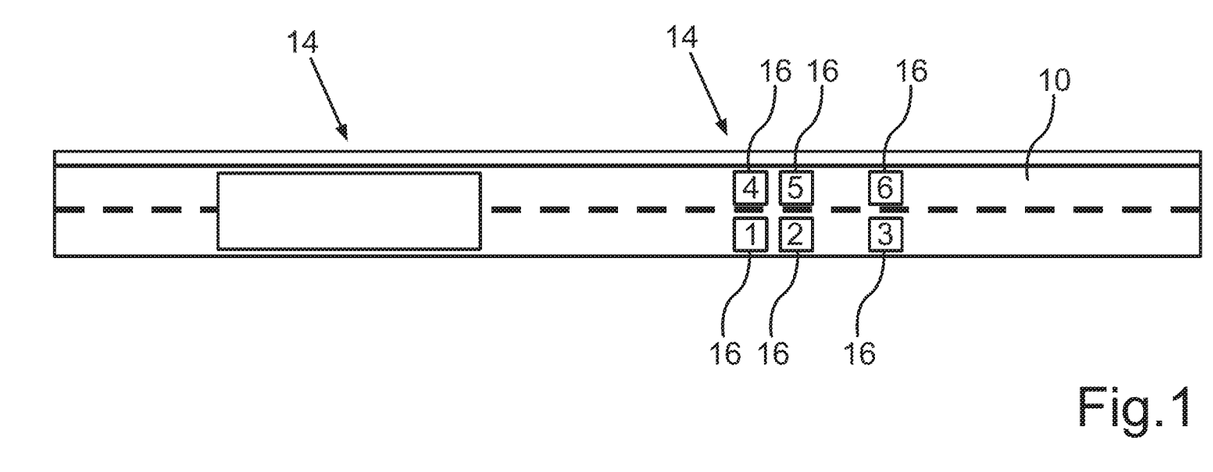
FIG. 1 shows a schematic aerial view of a road for a motor vehicle, in which a weighing device in a first embodiment and the weighing device in a second, alternative embodiment is integrated.
Figure 2A:
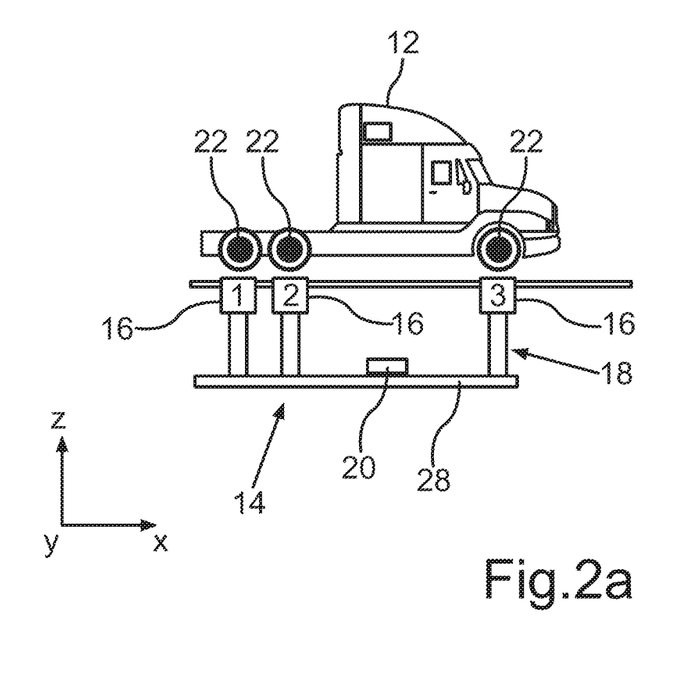
Figure 2B:
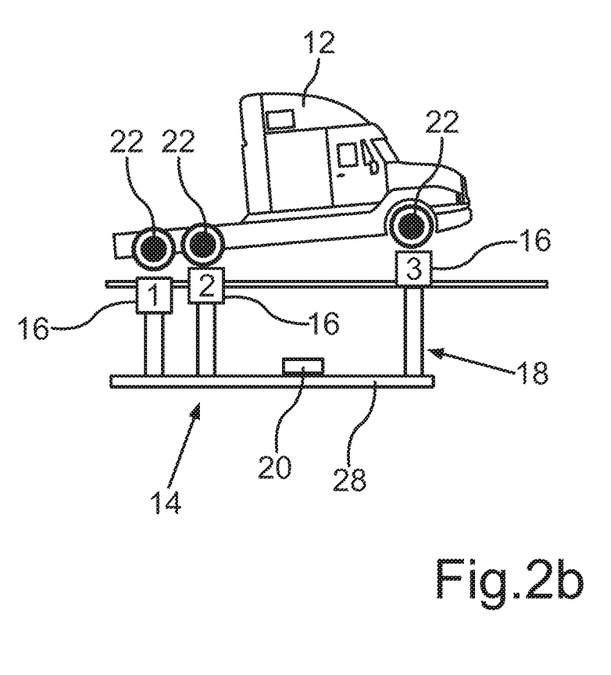
Figure 3:
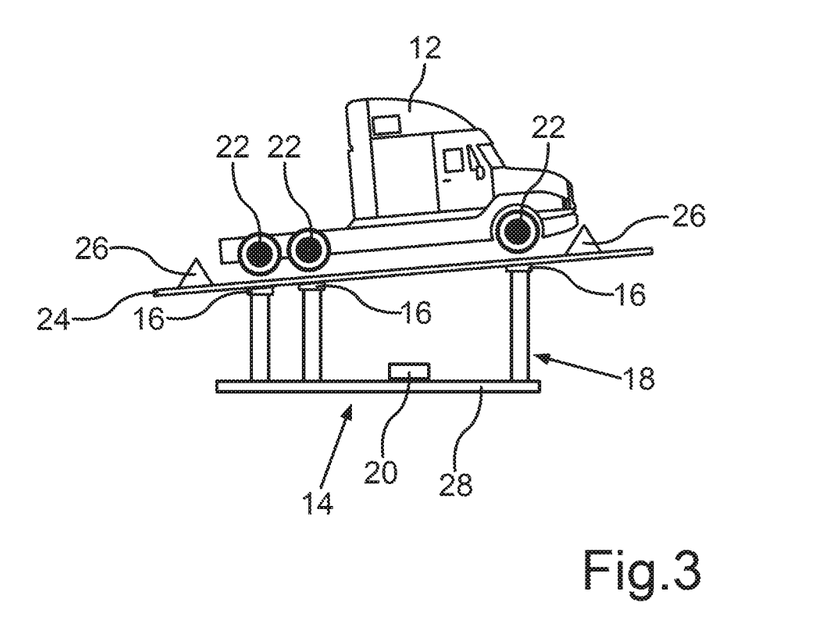

A road 10 for a motor vehicle 12, particularly for a motor truck is shown in FIG. 1. A weighing device 14 is integrated into the road 10. A weight and a center of gravity of the motor vehicle 12 can be determined by means of the weighing device 14. The weighing device 14 integrated into the road 10 is shown in two embodiments differing from one another in FIG. 1. A first embodiment of the weighing device 14 is shown in FIG. 3 in a side view, and a second embodiment of the weighing device 14 is depicted in FIGS. 2a and 2b in a side view. The weighing device 14 comprises several weighing elements 16 in each of the embodiments, particularly one weighing element 16 for each axle end of each axle of the motor vehicle 12. A measured value characterising a weight of the motor vehicle 12 can respectively be determined by means of each of the weighing elements 16. The weighing device 14 further comprises a displacement device 18, by means of which the alignment of the weighing elements 16 relative to one another can be adjusted. It is provided that the weighing elements 16 are arranged in a shared plane in every alignment of the weighing elements 16 relative to one another by means of the displacement device 18 to ensure that the motor vehicle 12 is respectively securely supported against the weighing elements 16 in every alignment of the weighing elements 16. Respective measured values characterising the weight of the motor vehicle 12 and assigned to the alignment can be recorded in each different alignment of the weighing elements 16 relative to one another. These measured values can be provided for an electronic computing device 20 of the weighing device 14 by the weighing elements 16. The electronic computing device 20 is presently schematically represented by a box. A center of gravity of the motor vehicle 12 can be determined by means of the electronic computing device 20 depending on the received measured values. The weighing device 14 is presently supported on a foundation 28, relative to which the spacing of the weighing elements 16 can be adjusted by means of the displacement device 18 in order to align the weighing elements 16 relative to one another.

As shown in FIGS. 2a and 2b, the weighing device 14 can be equipped such that wheels 22 of the motor vehicle 12 assigned to respective ends of respective axles of the motor vehicle 12 are directly supported on the weighing elements 16. This means that at least one wheel 22 of the motor vehicle 12 is supported on each of the weighing elements 16. As can be seen particularly clearly in FIG. 1, the respective weighing elements 16 can be received in the road 10, and thus be flush with the road 10 in at least one alignment relative to one another. In the first alternative embodiment of the weighing device 14 shown in FIG. 3, the weighing device 14 comprises a support element 24 that is supported on the weighing elements 16. The motor vehicle 12 can be supported on the support element 24. The motor vehicle 12 can be secured for example by means of the wheel chocks 26 against rolling away from the support element 24. In order to be able to determine the center of gravity of the motor vehicle 12 particularly easily and precisely by means of the weighing device 14, it is provided that the weighing elements 16 are arranged in at least two alignments differing from one another by means of the displacement device 18, and a respective measured value characterising the weight of the motor vehicle 12 is recorded in each of the alignments.

In order to determine the center of gravity of the motor vehicle 12, it is thus provided by means of the weighing device 14 that the motor vehicle 12 is supported on the weighing device 14, particularly with respective axle ends of respective axles of the motor vehicle 12 assigned to respective weighing elements 16. The weighing elements 16 are then aligned in different alignments relative to one another by means of the displacement device 18, particularly respectively in a shared plane, and respective measured values that characterize the weight of the motor vehicle 12 are recorded for the respective alignments by means of the weighing elements 16. The weighing elements 16 are presently displaced into a first state by means of the displacement device 18, which is shown in an exemplary form for the second embodiment of the weighing device 14 in FIG. 2a, and a first measured value is respectively recorded in this first state by means of the weighing elements 16, which characterizes the weight of the motor vehicle 12. It is further provided in the method that the weighing elements 16 are displaced into a second state by means of the displacement device 18, which is shown for the second embodiment of the weighing device 14 in FIG. 2b and for the first embodiment of the weighing device 14 in FIG. 3. A respective second measured value characterising the weight of the motor vehicle 12 is recorded by means of the weighing elements 16 in the second state of the weighing device 14. The displacement device 18 is further presently equipped to displace the weighing elements 16 into a third state, in which a respective third measured value characterising the weight of the motor vehicle 12 can be recorded by means of the weighing elements 16.

The weighing elements 16 are arranged in a first horizontal plane that presently runs in parallel to the foundation 28 in the first state. In the second state, the weighing elements 16 are arranged in a second plane pivoted around a transverse direction y of the motor vehicle 12 in relation to the first plane. In the third state, the weighing elements 16 are arranged in a third plane pivoted around a longitudinal direction x of the motor vehicle 12 in relation to the first plane. A sequence of the states into which the weighing elements 16 are displaced by means of the displacement device 18 can be freely selected. The displacement device 18 is particularly equipped to arrange the weighing elements 16 one immediately after the other in the respective states in order to be able to record the respective measured values assigned to the alignments. The respective first measured values, second measured values and third measured values can be received by means of the electronic computing device 20. The center of gravity of the motor vehicle 12 can be determined from the first measured values, the second measured values and the third measured values by means of the electronic computing device 20.

A center of gravity of an individual semitrailer engine as a motor vehicle 12 and a center of gravity of a semitrailer comprising a semitrailer engine and a trailer as a motor vehicle 12 can particularly be determined by means of the weighing device 14. In order to determine a center of gravity of the trailer, the center of gravity of the semitrailer comprising the semitrailer engine and the trailer can be determined by means of the weighing device 14, and the center of gravity of the individual semitrailer engine without the trailer can be determined separately. The center of gravity of the trailer can be determined by means of the electronic computing unit 20 via a difference calculation of the respective centers of gravity of the entire semitrailer and the individual semitrailer engine.

Figure 4:
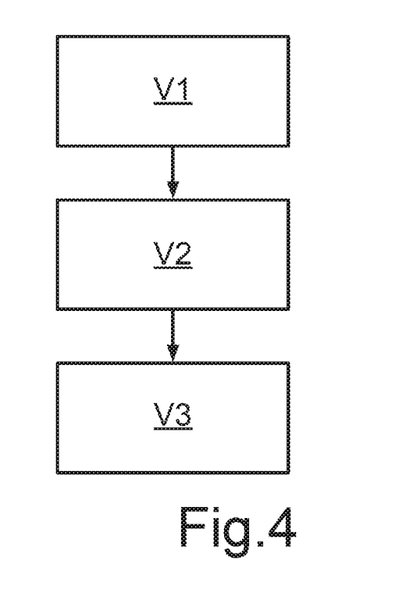
FIG. 4 shows a method schematic diagram for a method of operating the motor vehicle.

A method schematic diagram for a method of operating a motor vehicle 12 is shown in FIG. 4. It is provided in the method that the center of gravity of the motor vehicle 12 determined by means of the electronic computing device 20 is received in a first method step V1 by means of a driver assistance system. In a second method step V2, a steering angle and/or a steering speed and/or a steering moment for the motor vehicle 12 are selected by means of the driver assistance system. In a third method step V3, the motor vehicle 12 is controlled by means of the driver assistance system depending on the selected steering angle and/or the selected steering speed and/or the selected steering moment of the motor vehicle 12. In order to enable a particularly high vehicle stability of the motor vehicle 12, particularly in an at least partially automated, particularly fully automated operating state of the motor vehicle 12, it is provided that a traction limit for the motor vehicle 12, a tipping limit for the motor vehicle 12 and a manageability limit of a safety driver for the motor vehicle 12 are determined. The steering angle and/or the steering speed and/or the steering moment are particularly selected such that a resulting total force on a respective wheel 22 of the motor vehicle 12 does not exceed the pre-determined traction limit. The tipping limit of the motor vehicle 12 is further determined depending on the received center of gravity, and the steering angle and/or the steering speed and/or the steering moment are selected for the motor vehicle 12 such that the motor vehicle 12 does not tip over the tipping limit. The steering angle and/or the steering speed and/or the steering moment are further selected for the motor vehicle 12 such that a resulting movement trajectory of the motor vehicle 12 does not exceed the manageability limit of the safety driver of the motor vehicle 12.

The method described for determining the center of gravity of the motor vehicle 12 and the method for operating the motor vehicle 12 are based on the knowledge that a transverse dynamic of an autonomous utility vehicle is a substantial design criterion. It is particularly required in situations critical to the driving dynamic that limits of a driving dynamic are not exceeded. There are currently control systems in the utility vehicle sector such as electronic stability controls (ESP) that prevent driving dynamic limit situations. These control systems are mostly designed very conservatively, however, because a center of mass of the respective vehicle is not known. A braking intervention takes place long before a situation critical to the driving dynamic. It could thus be the case that a technically possible avoidance and the prevention of an accident cannot be put into practice. A safety driver is further not taken into account at this time when steering moments and steering angles are calculated.

Three criteria need to be satisfied to calculate the steering angle and/or the steering moment using output variables of an autonomous system and, simultaneously, input variables of a steering system of the motor vehicle 12. If one of the two characteristic values, and thus the steering angle or the steering moment exceeds a maximum respective range for the respective criterion, then this characteristic value is delimited. The first criterion is the traction limit, the second criterion is the tipping limit and the third criterion is the manageability limit of the safety driver.

Kamm's circle, which is also described as Kamm's circle of friction, depicts a distribution of a possible total force on the wheel 22 of the motor vehicle 12 in the form of a side guiding force and a drive/brake force. The steering angle and the steering speed as well as the steering moment that sets the steering angle should not exceed the traction limit. The center of weight in connection with acting centrifugal forces of the motor vehicle 12 is crucial for the tipping limit of the motor vehicle 12. The tipping limit can particularly be reached before the traction limit in the case of utility vehicles. The center of gravity of the motor vehicle 12 should thus be known in order to be able to determine the tipping limit particularly precisely. The center of gravity is particularly determined by means of the described method for determining the center of gravity of the motor vehicle 12. Driving dynamic models supplement the determined tipping limit and yield maximum transverse forces or a maximum steering angle or a maximum steering speed from which the steering moment can be derived.

Autonomous vehicles, presently the autonomous motor vehicle 12, are surveyed by the safety driver during the development. In certain circumstances, this safety driver has to intervene in the event of a judgement error and correct a current steering angle. The respective steering angle required by an autonomous system of the motor vehicle 12 or the force or the steering moment with which the steering angle is set should not exceed the manageability limit of the safety driver. This described method for operating the motor vehicle 12 enables a maximum physical limit region to be used, whereby a particularly high vehicle safety can be obtained. Safety drivers can further be taken into account in a homologation of autonomous driving systems.

The described weighing device 14 and the described method for determining the center of gravity of the motor vehicle 12 by means of the weighing device 14 is further based on the knowledge that it is necessary to know upper and lower limits of steering performance and brake performance to handle all dangers situations as well as possible in autonomous vehicles. One influencing variable for this is the center of gravity of the motor vehicle 12. Not only, but particularly in the case of municipal vehicles, this center of gravity can change by exchanging a structure, e.g., a salt spreader or a mower. Further examples of superstructures that change a center of gravity of the motor vehicle 12 are roof boxes and bicycle stands in the case of a passenger car as a motor vehicle 12. A result of determining the center of gravity of the motor vehicle 12 can be transmitted manually or in automated fashion to the motor vehicle 12 in order to be taken into account or processed by its dynamic control systems. Delta calculations can be carried out by means of the weighing device 14, particularly the electronic computing device 20. In these delta calculations, a semitrailer engine can be measured as a motor vehicle 12 in a first step, and then the center of gravity of a trailer of the semitrailer can be calculated by measuring an entire semitrailer as a motor vehicle 12.

Three measurements are particularly carried out to determine the center of gravity of the motor vehicle 12 in the longitudinal direction of the vehicle x, in the transverse direction of the vehicle y and in the vertical direction of the vehicle z. In a first measurement, all the weighing elements 16 are arranged in a first plane in parallel to the foundation 28, such that the motor vehicle 12 is aligned horizontally. The motor vehicle 12 stands respectively on two weighing elements 16 per axle. A respective weight on the axle ends of the axles of the motor vehicle 12 is recorded by means of the weighing elements 16. In the second measurement, the weighing elements 16 are displaced relative to one another, whereby the motor vehicle 12 is tipped around the transverse direction of the vehicle y. The motor vehicle 12 is aligned standing obliquely upwards in the longitudinal direction of the vehicle x. In the third measurement, the weighing elements 16 are raised only on one side of the motor vehicle 12, whereby the motor vehicle 12 is tipped around the longitudinal direction of the vehicle x. The motor vehicle 12 is arranged standing obliquely in the transverse direction of the vehicle y. After the measurements, the center of gravity of the motor vehicle 12 can be mathematically determined in the longitudinal direction of the vehicle x, in the transverse direction of the vehicle y and in the vertical direction of the vehicle z. In the case of semitrailers, center of gravity coordinates and forces of the motor vehicle 12 can be fed into a tractor unit and/or into a trailer. In the case of vehicles having superstructures, the center of gravity coordinates and the center of gravity forces can be fed into the respective vehicle, wherein a separate entry can be made in the vehicle, particularly the motor vehicle 12, for the respective structure.

For an implementation in the motor vehicle 12, the motor vehicle 12 can first be measured as described by means of the weighing device 14. Center of gravity coordinates and center of gravity forces of the motor vehicle 12 and an optional trailer can then be shared with a center of gravity provider of the motor vehicle 12 and/or of the trailer either via a human-machine interface or via a machine-to-machine interface, e.g., telematics in a telematic control device. The center of gravity providers make this information available to a driver control system at a vehicle start or at a point in time of a vehicle calibration of the motor vehicle 12. The vehicle control system can particularly be an electronic stability control of an electronic stability program. The vehicle control system can use this information to keep the semitrailer within stable limits and simultaneously to use this limit region as best possible. The determined center of gravity can be used by systems controlling the driving dynamic in order to keep the motor vehicle 12 within the tipping limit. The motor vehicle 12 can be connected to a main control device of the trailer via a control device for a trailer plug. The human-machine interface, the machine-to-machine interface, the center of gravity provider of the motor vehicle 12 and the control device can be connected to one another via an E/E network for the trailer plug.

A measurement of the motor vehicle 12 in the hub is generally possible by means of the weighing device 14. A particularly advantageous vehicle safety can thus be achieved.

Overall, the invention shows how a center of gravity of the motor vehicle 12 can be determined, and a maximum front wheel steering angle, a steering angle speed and a steering angle acceleration can be determined while maintaining vehicle stability of an autonomous utility vehicle.

The invention claimed is:

1. A weighing device (14) for determining a center of gravity of a trailer of a semitrailer, wherein the semitrailer comprises a semitrailer engine and the trailer, comprising:

at least two weighing elements (16), wherein a first respective measured value characterizing a weight of the semitrailer engine is determined by each of the at least two weighing elements (16) and wherein a second respective measured value characterizing a weight of the semitrailer comprising the semitrailer engine and the trailer is determined by each of the at least two weighing elements (16);

a computing device (20), wherein the first respective measured values are received from the at least two weighing elements (16) by the computing device (20) and wherein a center of gravity of the semitrailer engine is determined depending on the first respective measured values by the computing device (20), wherein the second respective measured values are received from the at least two weighing elements (16) by the computing device (20) and wherein a center of gravity of the semitrailer comprising the semitrailer engine and the trailer is determined depending on the second respective measured values by the computing device (20), and wherein the center of gravity of the trailer is determined from the center of gravity of the semitrailer engine and the center of gravity of the semitrailer comprising the semitrailer engine and the trailer by the computing unit (20); and a displacement device (18), wherein an alignment of the at least two weighing elements (16) relative to one another is adjustable adjusted by the displacement device (18).

2. The weighing device according to claim 1, wherein a respective wheel (22) of the semitrailer is supported on each of the at least two weighing elements (16).

3. The weighing device according to claim 1, further comprising a support element (24), wherein an underside of the support element (24) is supported on the at least two weighing elements (16), wherein the semitrailer is supported on an upper side of the support element (24), and wherein the support element (24) is aligned three-dimensionally by the displacement device (18).

4. A method for determining a center of gravity of a motor vehicle (12), comprising the steps of:
a) parking the motor vehicle (12) on a weighing device (14) with each axle end of respective axles of the motor vehicle (12) assigned to a respective weighing element (16) of the weighing device (14);
b) adjusting an alignment of the weighing elements (16) relative to one another by a displacement device (18), wherein the weighing elements (16) are arranged in at least two different alignments relative to one another and wherein a respective measured value characterizing a weight of the motor vehicle (12) is recorded in each of the alignments; and
c) receiving the measured values by a computing device (20) and determining the center of gravity of the motor vehicle (12) on a basis of the measured values;
wherein the steps a) to c) are respectively carried out for a semitrailer engine and for a semitrailer comprising the semitrailer engine and a trailer and wherein a center of gravity of the trailer is determined from a center of gravity of the semitrailer engine and a center of gravity of the semitrailer by the computing unit (20).

5. The method according to claim 4, wherein the weighing elements (16) are arranged in three alignments differing from one another by the displacement device (18) and wherein:
in a first state in which the weighing elements (16) are arranged in a first horizontal plane, a respective first measured value characterizing a weight of the motor vehicle (12) is recorded by the weighing elements (16);
in a second state in which the weighing elements (16) are arranged in a second plane pivoted around a transverse direction (y) of the motor vehicle (12) relative to the first horizontal plane, a respective second measured value characterizing a weight of the motor vehicle (12) is recorded by the weighing elements (16); and
in a third state in which the weighing elements (16) are arranged in a third plane pivoted around a longitudinal direction (x) of the motor vehicle (12) relative to the first horizontal plane, a respective third measured value characterizing a weight of the motor vehicle (12) is recorded by the weighing elements (16).

6. A method for operating a motor vehicle (12), comprising the steps of:
determining a center of gravity of the motor vehicle (12) by the method according to claim 4;
receiving the center of gravity by a driver assistance system; and
controlling the motor vehicle (12) depending on the received center of gravity.

7. The method according to claim 6, wherein a steering angle and/or a steering speed and/or a steering moment are selected for controlling the motor vehicle (12) such that a resulting total force on a respective wheel (22) of the motor vehicle (12) does not exceed a pre-determined traction limit.

8. The method according to claim 6, further comprising the steps of:
determining a tipping limit of the motor vehicle (12) depending on the received center of gravity; and
selecting a steering angle and/or a steering speed and/or a steering moment for the motor vehicle (12) depending on the tipping limit.

9. The method according to claim 6, further comprising the step of selecting a steering angle and/or a steering speed and/or a steering moment for the motor vehicle (12) depending on a manageability limit of a safety driver.

* * * * *